US009254926B2

(12) United States Patent
Maeda et al.

(10) Patent No.: US 9,254,926 B2
(45) Date of Patent: Feb. 9, 2016

(54) WARNING SYSTEM FOR AIRCRAFT, AND AIRCRAFT

(71) Applicant: MITSUBISHI AIRCRAFT CORPORATION, Aichi (JP)

(72) Inventors: Naoto Maeda, Aichi (JP); Masaya Miyoshi, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 37 days.

(21) Appl. No.: 14/192,072

(22) Filed: Feb. 27, 2014

(65) Prior Publication Data
US 2014/0253348 A1 Sep. 11, 2014

(30) Foreign Application Priority Data

Mar. 7, 2013 (JP) ................................. 2013-045506

(51) Int. Cl.
B64D 15/20 (2006.01)
B64D 15/22 (2006.01)
B64D 43/02 (2006.01)
(52) U.S. Cl.
CPC ...................................... B64D 43/02 (2013.01)
(58) Field of Classification Search
CPC ........ B64D 43/00; B64D 45/00; B64D 15/20;
B64D 43/02; B64D 15/00; B64D 15/22;
G08B 21/00

USPC ................. 340/962, 963, 964, 965, 966, 967;
244/134, 134 F, 181, 227, 5; 73/170.26,
73/170.02
See application file for complete search history.

(56) References Cited

U.S. PATENT DOCUMENTS

| 3,691,356 | A | * | 9/1972 | Miller .............................. 701/15 |
| 3,942,376 | A | * | 3/1976 | Gallington ...................... 73/180 |
| 4,893,245 | A | * | 1/1990 | Zweifel .............................. 701/6 |
| 5,595,357 | A | * | 1/1997 | Catlin et al. .................. 244/1 R |
| 5,803,408 | A | * | 9/1998 | Gast ................................ 244/178 |
| 6,140,942 | A | * | 10/2000 | Bragg et al. .................. 340/962 |
| 2008/0128556 | A1 | * | 6/2008 | Platt ........................... 244/134 F |
| 2013/0335243 | A1 | * | 12/2013 | Smyth et al. .................. 340/966 |

FOREIGN PATENT DOCUMENTS

JP 10264894 A 10/1998
JP 3252377 B2 11/2001

* cited by examiner

Primary Examiner — Hung T Nguyen
(74) Attorney, Agent, or Firm — Pearne & Gordon LLP

(57) ABSTRACT

To provide a warning system that can issue a stall warning taking a flight environment into account. The warning system according to the present invention is a warning system for an aircraft, for issuing a warning in the case where there is a possibility of the aircraft stalling, and includes a selecting section for selecting one of two or more calculation criteria based on an icing state of the aircraft, a calculating section for calculating a stall angle based on the selected calculation criterion, and a warning section for comparing the calculated stall angle with a current angle of attack of the aircraft and issuing a stall warning if the current angle of attack exceeds the stall angle.

17 Claims, 2 Drawing Sheets

WARNING SYSTEM FOR AIRCRAFT, AND AIRCRAFT

BACKGROUND OF THE INVENTION

1. Field of the Invention

The present invention relates to a warning system that gives a pilot a warning in the case where there is a possibility of an aircraft stalling.

2. Description of the Related Art

When an aircraft substantially turns up its nose thereof during its flight (when an angle of attack becomes larger), the aircraft loses a lift thereof required to keep flying, and eventually stalls. Thus, an aircraft includes a stall warning system, as a safety device for the aircraft, that notifies a pilot of a possibility that the aircraft may slow down to a stall speed and crash.

As means for notifying a pilot of a possibility of stalling, stick shakers are known. The stick shaker is provided to a control stick, and slightly vibrates the control stick to give a pilot a warning in the case where there is a possibility of stalling (Japanese Patent No. 3,252,377).

Japanese Patent No. 3,252,377 discloses a technique for issuing a stall detection signal to a stick shaker to give a pilot a warning when the angle of attack of an aircraft exceeds a given angle, but for safer flight, the given angle being a determination factor of stalling needs to be accurately specified.

Thus, the present invention has an object to provide a warning system for an aircraft for issuing a stall warning, with a flight environment taken into account.

SUMMARY OF THE INVENTION

The stall warning system of the present invention, which has been devised to achieve the above object, is a warning system for an aircraft for issuing a warning in the case where there is a possibility of an aircraft stalling, the warning system including a selecting section for selecting one of two or more calculation criteria based on an icing state of the aircraft, a calculating section for calculating a stall angle based on the selected calculation criterion, and a warning section for comparing the calculated stall angle with a current angle of attack of the aircraft and issuing a stall warning if the current angle of attack exceeds the stall angle.

The stall warning system of the present invention selects the calculation criterion based on the icing state of the aircraft, and calculates a stall angle based on the calculation criterion, and then determines whether or not to issue a stall warning based on the current angle of attack of the aircraft and the calculated stall angle. As a result, the stall warning system of the present invention can properly issue a stall warning in accordance with a flight environment.

The calculation criteria in the stall warning system of the present invention preferably include a calculation criterion A selected when ice accretion is not occurring and a calculation criterion B selected when ice accretion is occurring.

The stall warning system of the present invention prepares, to determine a stall, the calculation criterion A selected when the aircraft is not subjected to icing and the calculation criterion B selected when the aircraft is subjected to icing, and the stall warning system switches between the pieces of criterion data to be selected in accordance with the icing state of the aircraft, which allows the stall warning system to properly issue a stall warning in accordance with a flight environment.

Furthermore, when the selected calculation criterion is any one of the calculation criterion A and the calculation criterion B, the icing state is preferably identified by an icing flag that represents presence/absence of icing on the aircraft.

The presence/absence of icing on the aircraft can be determined by identifying the calculation criterion A or the calculation criterion B using the icing flag.

In the present invention, the calculation criterion B selected when ice accretion is occurring preferably includes a calculation criterion B1 selected when ice accretion is occurring immediately after takeoff, and a calculation criterion B2 selected ice accretion is occurring at a later time after takeoff.

By dividing the calculation criterion B into two calculation criteria, i.e., the calculation criterion B1 and the calculation criterion B2, a certain takeoff performance can be ensured without needlessly issuing a stall warning.

When the selected calculation criterion B is any one of the calculation criterion B1 and the calculation criterion B2, the icing state is preferably identified by the icing flag that represents the presence/absence of icing on the aircraft, and by landing information or airspeed information on the aircraft.

By identifying the icing state based on the landing information or the airspeed information, it is possible to determine whether or not the aircraft is at the point immediately after takeoff. This can prevent an unnecessary stall warning from being issued immediately after takeoff.

The icing flag of the stall warning system of the present invention preferably identifies the presence/absence of icing on the aircraft based on whether or not icing is detected on icing sensors provided to engines of the aircraft, wing leading-edges of the aircraft, or a fuselage of the aircraft.

By identifying the presence/absence of icing on the aircraft, it is possible to properly issue a stall warning in accordance with the flight environment.

In this case, icing on the wings or the engines can be detected by determination based on operations of anti-icing systems provided to the wing leading-edges or the engines.

By determining the icing on the wings or the engines based on the operations of the anti-icing systems, it is possible to determine the presence/absence of icing on the aircraft, and to properly issue a stall warning in accordance with the flight environment.

Furthermore, when the anti-icing systems operate, the icing flag continues to indicate that the aircraft is subjected to icing, unless predetermined conditions are satisfied.

By determining the presence/absence of icing on the aircraft, it is possible to properly issue a stall warning in accordance with the flight environment.

The predetermined conditions are preferably that the landing information is information indicating landing, and that the airspeed is lower than a predetermined value.

By providing the conditions, it is possible to determine the presence/absence of icing on the aircraft.

Furthermore, the above predetermined conditions are preferably that an outside air temperature is higher than a predetermined value, and that icing on a front portion of the fuselage is not detected.

By providing the conditions, it is possible to determine the presence/absence of icing on the aircraft.

The calculating section of the warning system for an aircraft according to the present invention can calculate the stall angle based on the selected calculation criterion, angles of flaps and slats of the aircraft, and a Mach number.

By calculating the stall angle, it is possible to issue a stall warning in accordance with an environment in which the aircraft flies.

These stall warning systems are typically employed in an aircraft.

In the stall warning system of the present invention, a criterion B is preferably divided into two criteria, i.e., a criterion B1 and a criterion B2. The criterion B1 is applied to the case where it is determined that the aircraft has past the point immediately after takeoff. In addition, the criterion B2 is applied to the case where it is determined that the aircraft is at the point immediately after takeoff.

Then, in a data selection step, any one of the criterion A, the criterion B1, and the criterion B2 is selected based on not only whether or not the aircraft has past the point immediately after takeoff but also the detected icing state of the aircraft, and in a determination step, it is determined whether or not there is a possibility of the aircraft stalling, by using selected any one of the criterion A, the criterion B1, and the criterion B2.

As described above, by dividing the criterion B into two criteria, i.e., the criterion B1 and the criterion B2, it is possible to issue a stall warning in accordance with a flying state.

In the stall warning system of the present invention, each of the criterion A, the criterion B1, and the criterion B2 can be configured to associate a stall warning angle of attack to issue a stall warning, with the speed of the aircraft and the angles of control surfaces of the aircraft.

With these pieces of the data, in the determination step, the detected speed of the aircraft and the angles of the control surfaces of the aircraft are looked up in selected any one of the criterion A, the criterion B1, and the criterion B2 to identify the stall warning angle of attack. Then, the identified stall warning angle of attack is compared with a detected actual angle of attack of the aircraft to determine whether or not there is a possibility of the aircraft stalling.

In the data selection step of the present invention, the icing state can be considered to be detected when an icing detector provided to the aircraft detects icing, or the anti-icing system provided to the aircraft starts. This is for imparting redundancy to the detection of the icing state.

According to the present invention, a stall warning can be correctly issued based on an icing state of the aircraft, which allows for provision of a warning system for an aircraft that adjusts to a flight environment.

DETAILED DESCRIPTION OF THE PREFERRED EMBODIMENTS

The embodiment of the present invention will be described below in detail with reference to the accompanying drawings.

Figure 1:
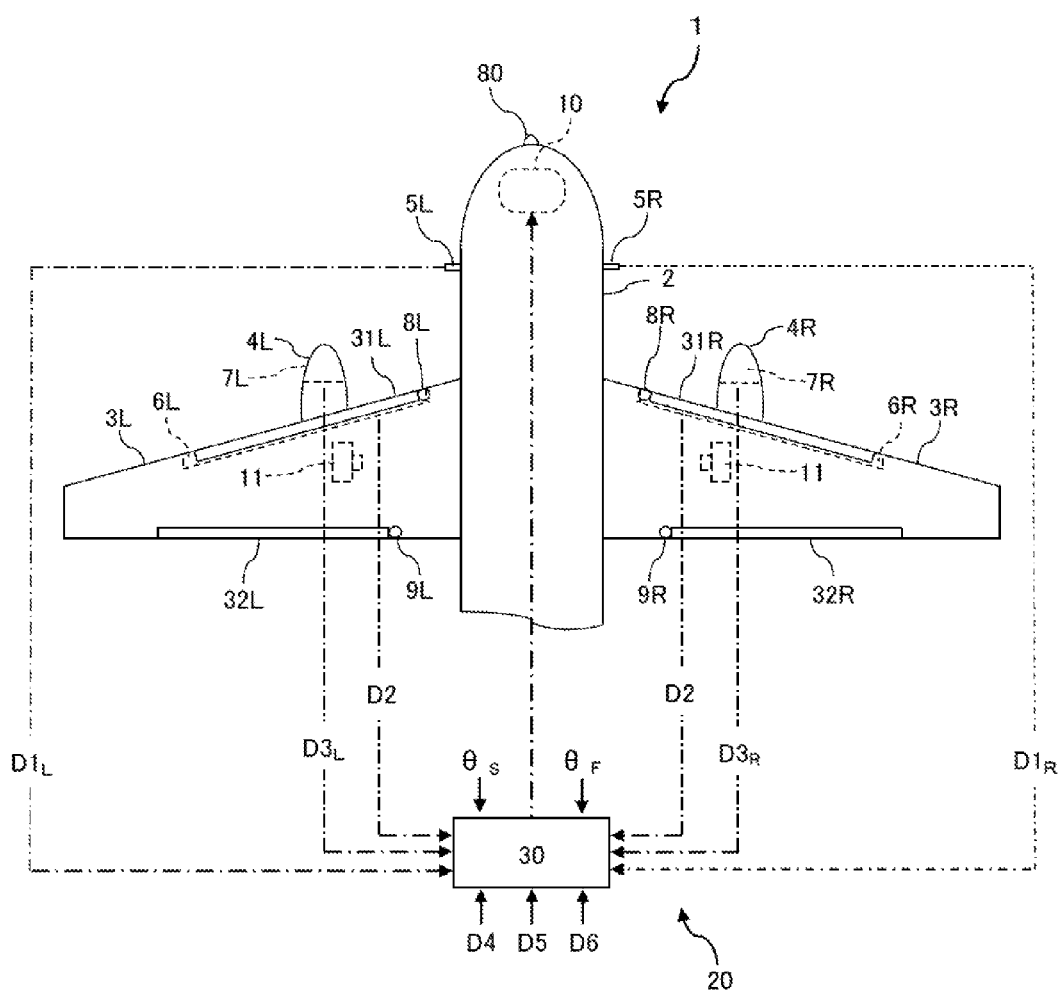
FIG. 1 is a diagram showing an aircraft including a stall warning system according to an embodiment of the present invention.

A stall warning system 20 of the present embodiment shown in FIG. 1 is a warning system for determining that the speed of an aircraft 1 is approaching a stall speed during its flight and notifying a pilot in a cockpit 10 of the determination. The stall warning system 20 can issue a stall warning in accordance with a flight environment (icing state) of the aircraft 1 by switching between criteria (hereinafter, also referred to as "calculation criteria"), in particular between pieces of table data, which is used for calculating a stall angle $\alpha s$ to be a threshold value to issue a stall warning, based on an icing state of the aircraft 1.

The stall warning system 20 issues a stall warning by causing a determination processing section 30, which is the core of the system, to obtain a variety of information from devices, equipment, and the like included in the aircraft 1.

The aircraft 1 includes icing detectors 5L and 5R provided on both sides, in a width direction, of a front portion of a fuselage 2, wing anti-icing systems 6L and 6R provided on leading-edges of a left-and-right pair of wings 3L and 3R, and engine anti-icing systems 7L and 7R provided on a left-and-right pair of turbofan engines 4L and 4R. Note that if the icing detectors 5L and 5R do not need to be distinguished, they may be collectively referred to as icing detectors 5. This also applies to the other left-and-right pair of devices, equipment, and the like.

In addition, the aircraft 1 includes angle sensors 8L and 8R and angle sensors 9L and 9R. The angle sensors 8L and 8R detect slat angles of leading-edge slats 31L and 31R provided on the wings 3L and 3R, respectively. The angle sensors 9L and 9R detect flap angles of trailing-edge flaps 32L and 32R provided on the wings 3L and 3R, respectively. Note that, in FIG. 1, illustrations of actuators for driving the leading-edge slats 31 (31L and 31R) and the trailing-edge flaps 32 (32L and 32R), and other flight control surfaces are omitted.

The icing detectors 5 are devices for detecting occurrence of icing on themselves. The icing detectors 5 transmit a signal identifying presence/absence of the icing on themselves, as icing information D1, to the determination processing section 30. Note that the icing information D1 may be distinctively written as icing information $D1_L$ and icing information $D1_R$, as individual detection results from the icing detectors 5L and 5R. Since the icing detectors 5 are provided respectively on the right and left sides of fuselage 2 and independently detect the icing, the detection results are independently transmitted to the determination processing section 30. For example, there may be a case where the one icing detector 5L detects the icing, whereas the other icing detector 5R does not detect the icing.

Various detectors can be applied to the icing detectors 5. For example, icing detectors that operate based on fluctuations of a natural frequency thereof due to presence/absence of icing, icing detectors that operate based on fluctuations of a capacitance between electrodes thereof due to presence/absence of icing, and other known detectors can be used therefor.

The wing anti-icing systems 6 (6L and 6R) are devices that prevent icing on the leading-edge slats 31L and 31R of the wings 3 (3L and 3R). The wing anti-icing systems 6 start by the operation of a pilot, or automatically start when the icing detectors 5 detect icing, regardless of the operation of the pilot. That is, when the icing detectors 5 detect the icing on themselves, the determination processing section 30 instructs the wing anti-icing systems 6 to start so as to prevent icing on the leading-edge slats 31L and 31R. Then, a signal identifying whether or not the wing anti-icing systems 6 operate is transmitted to the determination processing section 30 as wing anti-ice information D2.

Since the icing detectors 5L and 5R independently detect the icing, the determination processing section 30 can separately instructs the wing anti-icing systems 6 to operate, based on the detection of icing by the icing detectors 5L and 5R. However, it is also possible that the detection of icing by the one icing detector 5L causes both wing anti-icing systems 6L and 6R to simultaneously operate, and the present embodiment will be described based on this operation mode. Therefore, in the present embodiment, the pieces of wing anti-ice information D2 that identify the operations of the wing anti-icing systems 6L and 6R provided on the leading-edges of the wing 3, will be collectively written as a single piece of the information. Various anti-icing systems can be applied to the wing anti-icing systems 6. For example, anti-icing systems that make use of bleed air, and other known anti-icing systems can be used therefor.

The engine anti-icing systems 7L and 7R are provided to prevent icing on the leading-edges of the engines 4L and 4R. The engine anti-icing systems 7 start by the operation of a pilot, or automatically start when the icing detectors 5 detect icing, regardless of the operation of the pilot. That is, when the icing detectors 5 detect the icing on themselves, the determination processing section 30 instructs the engine anti-icing systems 7 to start so as to prevent icing on the leading-edges of the engines 4 (4L and 4R). A signal identifying whether or not the engine anti-icing systems 7 operate is transmitted, as engine anti-ice information D3, to determination processing section 30. Note that since the engine anti-icing systems 7 (7L and 7R) can independently operate, the engine anti-ice information D3 may be distinctively written as engine anti-ice information $D3_L$ and engine anti-ice information $D3_R$ corresponding to the engine anti-icing systems 7L and 7R, respectively.

Various anti-icing systems can be applied to the engine anti-icing systems 7. For example, known anti-icing systems such as anti-icing systems that make use of bleed air can be used therefor, similar to the wing anti-icing systems 6.

The angle sensors 8L and 8R detect slat angles $\theta_{SL}$ and $\theta_{SR}$ of the leading-edge slats 31L and 31R, respectively, and transmit the detected angles to the determination processing section 30. In addition, the angle sensors 9L and 9R detect flap angles $\theta_{FL}$ and $\theta_{FR}$ of the trailing-edge flaps 32L and 32R, respectively, and transmit the detected angles to the determination processing section 30.

An angle-of-attack sensor 80 is provided to the aircraft 1, and detects a current angle of attack α of the aircraft 1 and transmit the detected angle to the determination processing section 30.

The determination processing section 30 obtains landing information D4 that identifies whether or not main landing gears 11 (FIG. 1) of the wings 3 land. The landing information D4 can be obtained by, for example, configuring the main landing gears 11 to contract under a load and to expand when the load is released therefrom, and by detecting the contraction or expansion.

In addition, the determination processing section 30 obtains airspeed information D5 that identifies the airspeed of the aircraft 1 and outside air temperature information D6 that identifies an outside air temperature of the aircraft 1. The airspeed information D5 is detected by a pitot tube (not shown), and the outside air temperature information D6 is detected by a temperature sensor (not shown) provided to the outside of an airframe.

Figure 2:
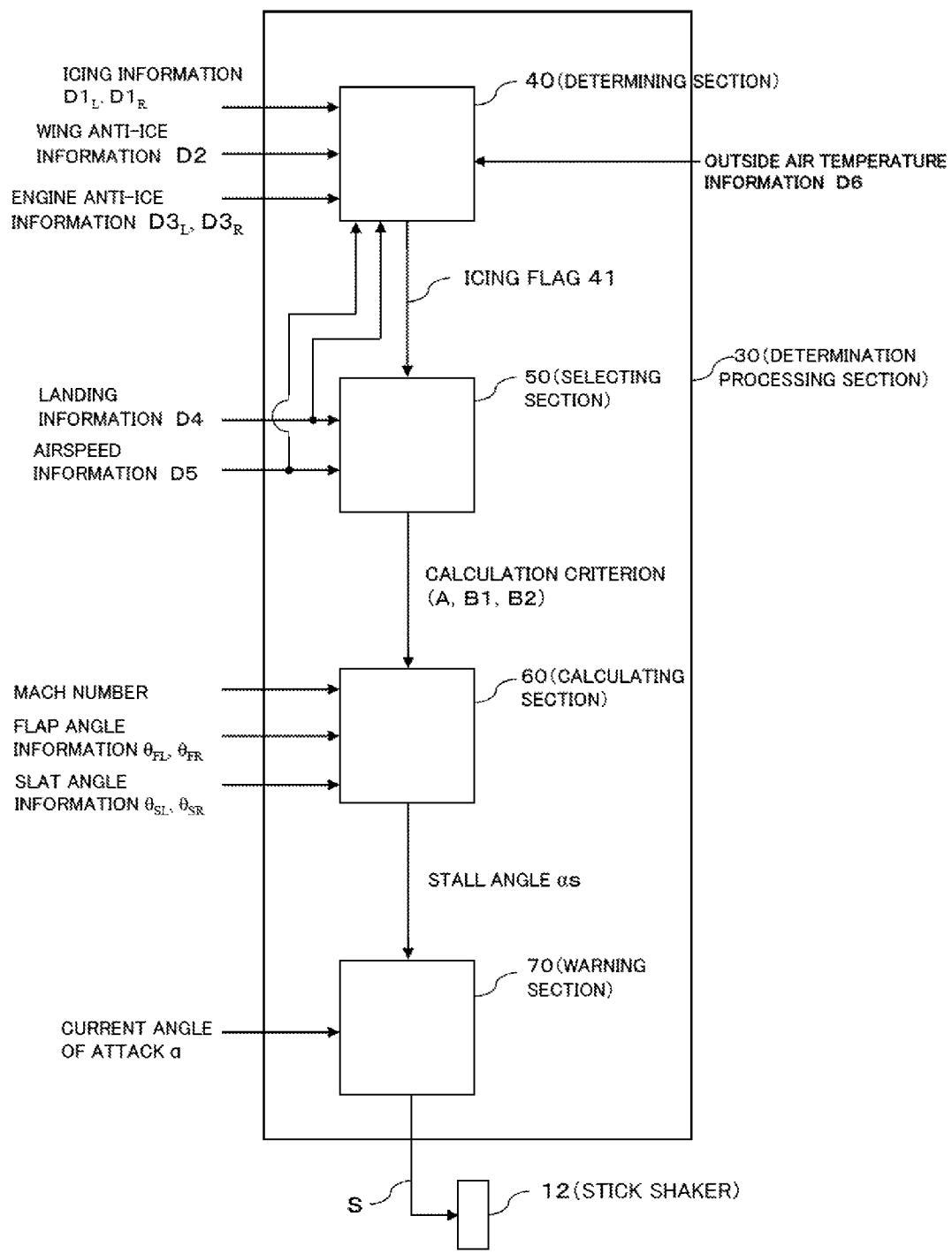
FIG. 2 is a diagram showing logic implemented in the stall warning system in FIG. 1.

As shown in FIG. 2, the determination processing section 30 obtains a variety of information such as the abovementioned icing information D1, the wing anti-ice information D2, the engine anti-ice information D3, and the angle information $\theta_{SL}$ and $\theta_{FL}$, and determines whether or not there is a possibility of stalling. If it is determined that there is the possibility of stalling, as a result of the determination process, the determination processing section 30 generates an instruction signal S that causes a stick shaker 12 to vibrate.

The determination processing section 30 includes an icing presence/absence determining section 40 (determining section), a calculation criterion selecting section 50 (selecting section), a stall angle calculating section 60 (calculating section), and a warning section 70.

[Icing Presence/Absence Determining Section 40]

The icing presence/absence determining section 40 determines whether or not the aircraft 1 is subjected to icing, based on the icing information D1 ($D1_L$ and $D1_R$), the wing anti-ice information D2, and the engine anti-ice information ($D3_L$ and $D3_R$). That is, a determining circuit 42 of the icing presence/absence determining section 40 determines that the aircraft 1 "is subject to icing" in any of the following cases: (1) any one of the pieces of icing information $D1_L$ and $D1_R$ is information that identifies icing on any one of the icing detectors 5L and 5R; (2) the wing anti-ice information D2 is information that identifies the operations of the wing anti-icing systems 6L and 6R; and (3) any one of the pieces of engine anti-ice information $D3_L$ and $D3_R$ is information that identifies any one of the operations of engine anti-icing systems 7L and 7R. On the other hand, the determining circuit 42 determines that the aircraft 1 "is not subjected to icing" in a case other than (1) to (3). These determination results are written in an icing flag 41.

Note that the icing presence/absence determining section 40 includes a latch circuit (not shown), and is configured to maintain the determination that the aircraft 1 "is subjected to icing" when the wing anti-ice information D2 is the information that identifies the operations of the wing anti-icing systems 6 and thereafter the operations of the wing anti-icing systems 6 are stopped, unless predetermined conditions are satisfied. This is because even when the aircraft 1 leaves an icing environment after it is once determined to be subjected to icing, the icing is not always removed from non-anti-icing areas being areas other than anti-icing areas, which are covered by the wing anti-icing systems 6.

Furthermore, the icing detectors 5 are also operation objects of the above latch circuit, like the wing anti-icing systems 6, for the same reason.

Meanwhile, the engine anti-icing systems 7 are provided to prepare for a possibility of icing on the air intake sides of the engines 4 due to air intake by the engines 4 (inlet icing). Therefore, the aircraft may take off after starting the engine anti-icing systems 7. In such a case, since the anti-icing works on portions where the inlet icing is assumed in advance, it can be determined that the icing is removed after the aircraft 1 leaves the icing environment. Thus, the icing presence/absence determining section 40 determines that the aircraft 1 is not subjected to icing when the operations of the engine anti-icing systems 7 are stopped (the latch circuit does not operate).

The release condition of the latch circuit is satisfied when any one of the following conditions R1 and R2 holds.

The condition R1: it is determined that the aircraft 1 has definitely landed. That is, the condition R1 is determined to hold when the landing information D4 is the information identifying the landing of the main landing gears 11 and an airspeed V identified by the airspeed information D5 is lower than a predetermined threshold value $V_T$ ($V<V_T$).

The condition R2: it is determined that the outside air temperature of the aircraft 1 is high and the aircraft 1 is not subjected to icing. That is, the condition R2 is determined to hold when an outside air temperature T identified by the outside air temperature information D6 is higher than a predetermined threshold value $T_T$ ($T>T_T$), and a state continues where the icing information D1 indicates that the icing detectors 5 do not detect the icing, for a predetermined period of time.

[Calculation Criterion Selecting Section 50]

The calculation criterion selecting section 50 selects one of tables A, B1, and B2 (hereinafter also referred to as "calculation criteria") that are prepared in advance based on the icing flag 41, the landing information D4, and the airspeed information D5.

The tables A, B1, and B2 are three-dimensional tables each of which is expressed as a function of a Mach number, the slat angles $\theta_S$ of the leading-edge slats 31, and the flap angles $\theta_F$ of the trailing-edge flaps 32, and are to be the calculation criteria used for calculating the stall angle αs to be the threshold value to determine the possibility of stalling.

Functions of the table A, the table B1, and the table B2 are defined such that, when the Mach number, the slat angles $\theta_S$, and the flap angles $\theta_F$ are fixed, the stall angle αs is calculated to be largest for the table A. The calculated values of the stall angle αs are larger for tables subsequently in the order of B1 and B2.

The table A is a calculation criterion selected when the aircraft 1 is not subjected to icing. That is, when the icing flag 41 identifies that the aircraft 1 "is not subjected to icing," the calculation criterion selecting section 50 selects the table A as the calculation criterion. When the aircraft 1 is not subjected to icing, the possibility of stalling is small even if the angle of attack of the aircraft 1 is large, as compared with the case of icing. Therefore, to notify a pilot of a warning with a proper frequency, the stall angle αs is set at a relatively high value.

Next, the tables B1 and B2 are both calculation criteria selected when the aircraft 1 is subjected to icing. That is, when the icing flag 41 identifies that the aircraft 1 "is subjected to icing," the calculation criterion selecting section 50 selects any one of the tables B1 and B2.

Here, the table B1 is a selected criterion used in an icing state immediately after takeoff, and the table B2 is a selected criterion used in an icing state later than immediately after takeoff. Since the amount of icing is small immediately after the aircraft 1 takes off, the frequency of issuing a stall warning will be increased if stalling is determined in a fail-safe manner. To avoid this, a flight angle of attack needs to be small by increasing a flight speed, but to increase the flight speed, a long takeoff runway length is required, which unnecessarily degrades takeoff performance. Hence, by making a division into the table B1 applied in the icing state immediately after takeoff and the table B2 applied later than immediately after takeoff, a certain level of takeoff performance can be ensured without needlessly issuing a stall warning, even in "the case of ice accretion."

Thus, when the landing information D4 identifying that the main landing gears 11 land is not received for a certain period of time, or the airspeed identified by the airspeed information D5 is higher than a predetermined speed, the calculation criterion selecting section 50 determines that a predetermined period of time has elapsed after the aircraft 1 took off (not immediately after takeoff), and selects the table B2. On the other hand, when the above condition to select the table B2 is not satisfied, the table B1 is selected.

[Stalling Angle Calculating Section 60]

The stall angle calculating section 60 calculates the stall angle αs based on a table that the calculation criterion selecting section 50 selects from among the table A, the table B1, and the table B2. That is, the Mach number, the slat angles $\theta_S$ ($\theta_{SL}$ and $\theta_{SR}$) of the leading-edge slats 31, and the flap angles $\theta_F$ ($\theta_{FL}$ and $\theta_{FR}$) of the trailing-edge flaps 32 are looked up in the selected table to calculate the stall angle αs. Note that, with respect to the slat angles $\theta_S$ and the flap angles $\theta_F$, the left and right slat angles $\theta_{SL}$ and $\theta_{SR}$ or the left and right flap angles $\theta_{FL}$ and $\theta_{FR}$ are used in combination as input values to calculate four values, the smallest of which is identified as the stall angle αs.

[Warning Section 70]

The warning section 70 compares the stall angle αs that is identified as a result of the calculation, with the current angle of attack α of the aircraft measured by the angle-of-attack sensor 80. Then, when the current angle of attack α exceeds the stall angle αs, the warning section 70 generates the instruction signal S that causes the stick shaker 12 to vibrate, and transmits the instruction signal S to the stick shaker 12. Vibration of the stick shaker 12 gives a pilot a warning of a possibility of stalling.

As described above, the stall warning system 20 according to the present invention switches among the calculation methods of the stall angle αs to be a criterion to issue a stall warning, depending on the icing state of the aircraft 1. As a result, according to the stall warning system 20 of the present invention, a stall warning can be issued in accordance with an environment in which the aircraft 1 flies, which contributes safe flight of the aircraft 1.

In addition, the stall warning system 20 switches among the calculation methods to issue a warning distinguishing whether or not the aircraft 1 is at the point immediately after takeoff, which allows for preventing the issuing of an unnecessary stall warning immediately after takeoff. As a result, the stall warning system 20 will not degrade the takeoff performance.

Although the present invention is described above based on the embodiment, the configuration described in the above embodiment may be chosen or changed to other configurations as appropriate without departing from the gist of the present invention.

Although the stall warning system 20 includes three tables, i.e., the table A, the table B1, and the table B2, this is the most preferable configuration, and the present invention includes a configuration which includes at least two tables, one applied when the aircraft is not subjected to icing and the other applied when the aircraft is subjected to icing. Also with this configuration, a stall warning can be issued in accordance with an environment in which the aircraft 1 flies (icing state).

Although the stall warning system 20 uses tabular data (table A and tables B (B1 and B2)) as the criteria to calculate the stall angle αs, the present invention is not limited thereto, and a three-dimensional arithmetic expression can be also used.

The stall warning system 20 utilizes three criteria, i.e., (1) icing detection with the icing detectors 5, (2) operations of the wing anti-icing systems 6, and (3) operations of the engine anti-icing systems 7, as determination criteria of the presence/absence of icing on the aircraft 1. However, the present invention is not limited thereto. For example, confirmation of icing by a visual check made by a pilot, a possibility of icing due to an outside air temperature and a moisture content, and the like can be used alone or in combination, with three determination criteria of the present embodiment. In the case of visual check, for example, when a pilot confirms icing, the pilot may manually start the wing anti-icing systems 6 or the engine anti-icing systems 7. Further, presence/absence of icing can be determined according to only one criterion selected from among the three determination criteria of the present embodiment.

The stall warning system 20 can use, for example, a variety of information such as the altitude of the aircraft 1, a period of time elapsed from taking off, with which it can be determine whether or not the aircraft is at the point immediately after takeoff, as criteria to select the table B1 or the table B2.

Although, in the stall warning system 20, the stall angle αs is expressed as a function of three elements, i.e., the Mach number, the slat angles $\theta_S$, and the flap angles $\theta_F$, the present invention is not limited thereto. For example, the altitude, the temperature, the engine power, the angular velocity of the airframe, or the like of the aircraft 1 can be used as elements of the function expressing the stall angle αs. Although the stall warning system 20 uses the instruction signal S to cause the stick shaker 12 to vibrate, the stall warning system 20 can also issue a warning that produces visual or audio effects.

What is claimed is:

1. A warning system for an aircraft for issuing a warning in the case where there is a possibility of an aircraft stalling, the warning system comprising:
   a selecting section for selecting one of two or more calculation criteria based on an icing state of the aircraft;
   a calculating section for calculating a stall angle based on the selected calculation criterion; and
   a warning section for comparing the calculated stall angle with a current angle of attack of the aircraft, and issuing a stall warning if the current angle of attack exceeds the stall angle.

2. The warning system for an aircraft according to claim 1, wherein the calculation criteria include a calculation criterion A selected when ice accretion is not occurring and a calculation criterion B selected when ice accretion is occurring.

3. The warning system for an aircraft according to claim 2, wherein the calculation criterion B selected when ice accretion is occurring includes a calculation criterion B1 selected when ice accretion is occurring immediately after takeoff, and a calculation criterion B2 selected when ice accretion is occurring at a time later than immediately after takeoff.

4. The warning system for an aircraft according to claim 2, wherein the icing state is identified by an icing flag that represents presence/absence of icing on the aircraft.

5. The warning system for an aircraft according to claim 3, wherein the icing state is identified by an icing flag that represents presence/absence of icing on the aircraft, and by landing information or airspeed information of the aircraft.

6. The warning system for an aircraft according to claim 4, wherein the icing flag identifies the presence/absence of icing on the aircraft based on whether or not icing on icing sensors provided to engines of the aircraft, wing leading-edges of the aircraft, or a fuselage of the aircraft is detected.

7. The warning system for an aircraft according to claim 5, wherein the icing flag identifies the presence/absence of icing on the aircraft based on whether or not icing on icing sensors provided to engines of the aircraft, wing leading-edges of the aircraft, or a fuselage of the aircraft is detected.

8. The warning system for an aircraft according to claim 6, wherein icing on the wings or the engines is detected by determination based on operations of anti-icing systems provided to the wing leading-edges or the engines.

9. The warning system for an aircraft according to claim 7, wherein icing on the wings or the engines is detected by determination based on operations of anti-icing systems provided to the wing leading-edges or the engines.

10. The warning system for an aircraft according to claim 8, wherein when the anti-icing systems operate, the icing flag continues to indicate that the aircraft is subjected to icing, unless predetermined conditions are satisfied.

11. The warning system for an aircraft according to claim 9, wherein when the anti-icing systems operate, the icing flag continues to indicate that the aircraft is subjected to icing, unless predetermined conditions are satisfied.

12. The warning system for an aircraft according to claim 10, wherein the predetermined conditions are that the landing information is information indicating landing, and that the airspeed is lower than a predetermined value.

13. The warning system for an aircraft according to claim 11, wherein the predetermined conditions are that the landing information is information indicating landing, and that the airspeed is lower than a predetermined value.

14. The warning system for an aircraft according to claim 10, wherein the predetermined conditions are that an outside air temperature is higher than a predetermined value, and that icing on a front portion of the fuselage is not detected.

15. The warning system for an aircraft according to claim 11, wherein the predetermined conditions are that an outside air temperature is higher than a predetermined value, and that icing on a front portion of the fuselage is not detected.

16. The warning system for an aircraft according to claim 1, wherein the calculating section calculates the stall angle based on the selected calculation criterion, angles of flaps and slats of the aircraft, and a Mach number.

17. An aircraft comprising the warning system according to claim 1.

* * * * *